Patented June 24, 1941

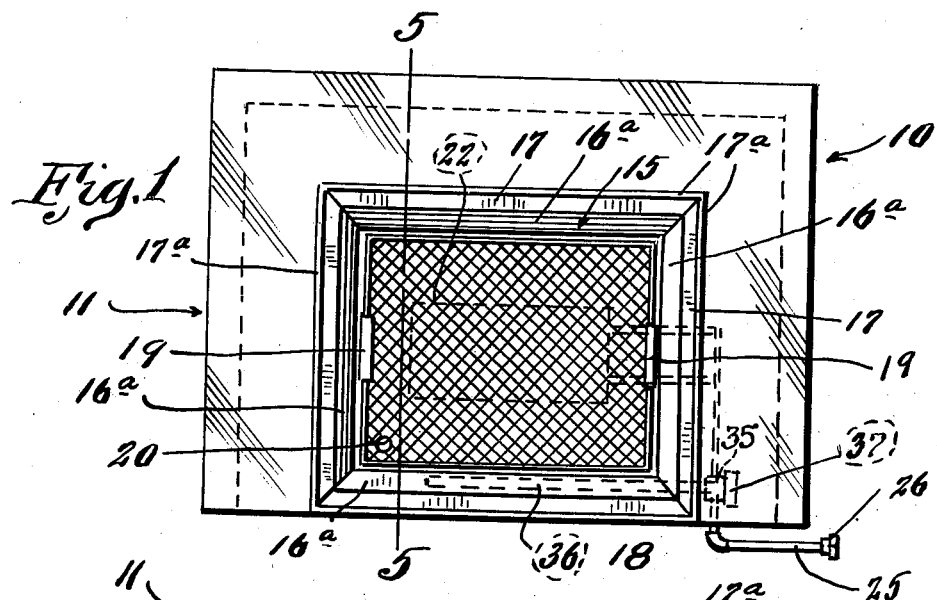

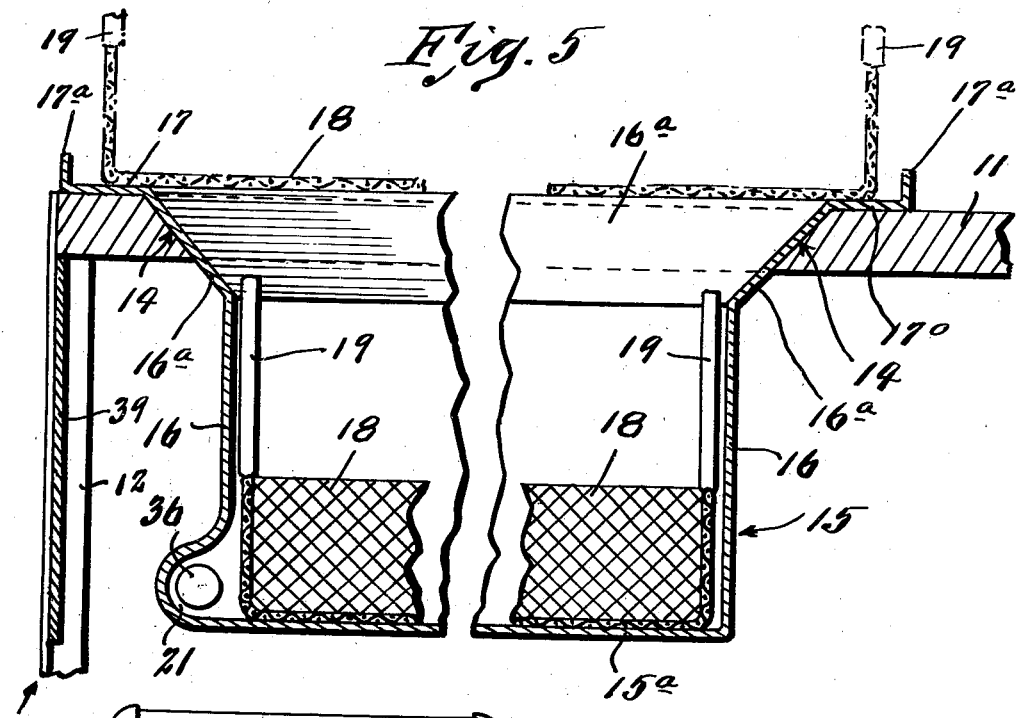
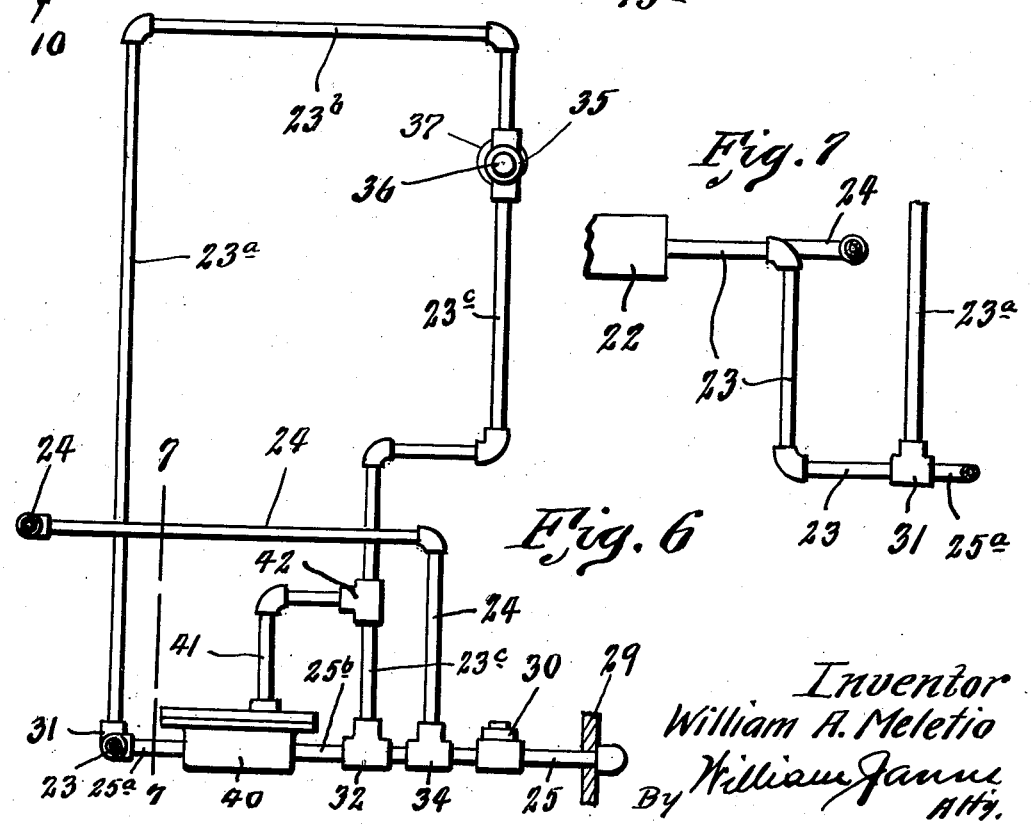

2,246,854

UNITED STATES PATENT OFFICE 2,246,854

PORTABLE UTILITY FRYER

William A. Meletio, St. Louis, Mo.

Application January 23, 1939, Serial No. 252,347

3 Claims. (Cl. 126—39)

This invention relates to portable utility fryers.

One of the principal objects of the invention is the provision of a fryer which can be used for frying a comparatively large number of fish or similar articles of food at one time, which is portable and can be moved and transported readily and which has the burner and the controls thereof mounted so that the fryer can be quickly connected to a suitable source of fuel supply, such as bottled gas.

Another object of the invention is to provide a fryer in which the frying pan or tank is countersunk in the top of a suitable stand in spaced-apart relation with the stand and the edges of said top whereby table space is provided for plates at the front and the sides of the stand.

Another object of the invention is to provide a portable fryer having a frying pan or tank formed at its upper end with outwardly inclined portions terminating in horizontal flanges, the edges of which are turned upwardly whereby said horizontal flanges and said inclined portions serve to drain the frying fat or oil back into the tank and said vertical edges or flanges prevent said oil from running onto the table top, the length of the frying pan being greater than the width thereof whereby a rack or basket disposed in said pan can be placed transversely of the latter and rest on the longitudinal flanges of said tank within said vertically disposed edges thereof.

Further objects of the invention are to provide means for automatically controlling the temperature of the frying medium.

With these and other objects in view, my invention consists in certain novel features of construction and arrangement of parts hereinafter more fully described, claimed, and illustrated in the accompanying drawings, in which—

Figure 1 is a top plan view of the portable fryer.

Figure 2 is a rear elevation thereof.

Figure 3 is a side elevation, partly broken away.

Figure 4 is an enlarged detail cross section taken on line 4—4 of Figure 2.

Figure 5 is an enlarged cross section, partly broken away, taken on line 5—5 of Figure 1.

Figure 6 is an enlarged detail view of the pipe connections and their controls.

Figure 7 is a section taken on line 7—7 of Figure 6.

Referring by numerals to the accompanying drawings, 10 indicates a table comprising a top 11 and legs 12. The top 11 is formed with an opening 14 in which is received a frying pan or tank 15. This pan is of rectangular shape and has a flat bottom 15a and vertically disposed walls 16. Just below the top 11 the side walls 16 are inclined outwardly, as indicated at 16a, and terminate in horizontal flanges 17 overlying said top. The edges of these flanges are bent vertically and upwardly, as indicated at 17a. The purpose of these upturned edges 17a is to prevent oil or other frying medium from running on the table top while the inclined portions 16a serve to drain said medium back into the tank. This tank is of a suitable depth to receive the proper amount of oil or other fat and a basket or rack 18. Preferably this basket is made of woven wire and has two handles 19 which extend upwardly a suitable distance above the level of the oil.

The tank or pan 15 is longer in one direction than in the other and the basket 18 is of similar dimensions fitting loosely within said tank. This basket can be raised and placed transversely of the tank with its ends resting on the longitudinally disposed flanges 17. Thus the oil or other frying medium can be drained from the basket and the fried fish contained therein directly into said tank while said flanges 17 and edges 17a prevent the oil from escaping or splashing onto the table top.

A valve drain 20 is disposed in one corner of the bottom 15a through which the tank can be emptied of the oil. Formed in one of the vertical walls 16, preferably the rear wall and near the bottom wall 15a, is a longitudinally disposed recess 21.

Located under the tank is a gas burner 22 which is supplied with gas or other suitable fuel by a pipe 23. A pilot light, not shown, is arranged in the burner and is supplied with gas by a pipe 24. A horizontally disposed supply pipe 25 is disposed transversely near one end of the stand a suitable distance below the burner and has the outer end projecting outwardly from said stand and provided with a coupling 26 by means of which said pipe 25 can be connected to a tank of bottled gas or other suitable source of fuel supply. Preferably pipe 25 is supported on a horizontally disposed shelf 28 which latter is arranged in said stand near the lower end thereof. A bracket 29 is fixed to the rear member of the shelf and supports the projecting end of said pipe 25. A manually operated shut-off valve 30 is arranged in pipe 25 near basket 29. Fuel pipe 23 is connected to a T-connection 31 and extends vertically and upwardly, as indicated at 23a, and then horizontally, as indicated at 23b, and then downwardly, as indicated at 23c, and connects to a T-connection 32 in pipe 25. Pilot pipe 24 is connected to supply pipe 25 by a T-connection 34 at a point between valve 30 and the T-connection 32.

Interposed in pipe 23c is an automatic valve 35 which is operated by a temperature responsive means 36. Valve 35 is located adjacent to one side of tank 15 and element 36 extends horizontally into said tank and occupies a position in the recess 21. Valve 35 is adjustable manually so that when the oil in the tank 15 reaches a selected degree said valve is actuated by said element 36 into closed position to shut off the gas supply to the burner. As the pilot pipe 24 is connected to the supply pipe 25 ahead of T-connection 32 the pilot light is not affected and will reignite the gas when the valve 35 is automatically opened. The shut-off valve 30 which is manually operated cuts off the gas to the pilot pipe 24, as well as to the burner pipe 23.

The valve 35 is adjustable manually by means of a hand knob 37 which is reached through an opening 38 formed in the rear wall 39. Element 36 is preferably a high capacity thermostat and associated with it is a diaphragm control valve 40 which is interposed between T-connections 31 and 32 being connected to the former by a pipe 25a and to the latter by a pipe 25b. The upper end of control valve 40 is connected by a pipe 41 and a T-connection 42 to pipe 23c.

When the temperature of the frying medium in tank 15 is below a preselected degree, both valves 35 and 40 are open and gas is supplied to the burner by pipes 23a, 23b and 23c, as well as pipes 25a and 25b. When the thermostat 36 is operated by high temperature it shuts off valve 35. The back pressure created in pipe 23c is transmitted through pipe 41 to the diaphragm control valve 40 which is operated by said pressure and closes the connection between pipes 25a and 25b, thereby shutting off the supply of gas to the burner.

When the temperature in the tank drops sufficiently, thermostat 36 is operated to open valve 35. This removes the pressure from the diaphragm of valve 40 causing the latter to open and allow flow of gas through pipes 25a and 25b to pipe 23.

The front and the sides of the stand are closed by walls 42 which are preferably provided near their upper ends with a plurality of apertures 43. The rear side wall 39 is comparatively narrow and extends only a short distance below the burner while the front and side walls 42 extend downwardly to the shelf 28.

The table top 11 is arranged at the rear end flush with the frame 12 in order to allow the operator to stand close to the tank 15. The front and sides of the table top 11 extend beyond the frame to provide table surface for supporting plates, cups and the like. The basket 18 is longer in one direction than in the other and the top of the tank 15 is flared out so as to enable the operator to place the basket transversely of the tank with the ends of said basket resting on longitudinal horizontal flanges 17 of said tank. Thus the frying medium or oil is allowed to drain from the basket direct into the tank. The vertical flanges 17a prevent the oil from escaping onto the table top.

My portable fryer can be moved readily, is compact and can be readily attached to a source of fuel supply such as a tank of bottled gas, and is quick in action. The shelf 28 provides storage means for plates, and the food to be fried. Preferably two baskets 18 are provided so that while one basket is in the tank 15, the other basket with the cooked food is resting on top of the tank to one end thereof. The extended portions of the table top 11 provide space on three sides of the fryer for plates, sandwiches, and the like. The thermostat provides automatic control so that the cook is not required to pay any attention to the burner.

While I have shown and described herein the preferred form of my invention, it is obvious that various changes in the construction and arrangement of parts of the fryer can be made without departing from the spirit of my invention.

I claim:

1. A portable fryer of the class described comprising a table having its top formed with an oblong opening, an open topped oblong tank arranged within said opening, laterally and outwardly disposed flanges fixed on the upper end of said tank and overlying said top, an upright marginal flange formed integral with each lateral flange and extending above said top, an oblong reticulated basket removably placed in said tank, said basket being adapted to be placed transversely of said tank with the ends of its bottom resting on the longitudinal lateral flanges of said tank to facilitate drainage, and means for heating said tank.

2. A portable fryer of the class described comprising a stand, a table top therefor having an oblong opening, an open topped oblong tank arranged in said opening, said tank having a flat bottom and having its side walls terminating in horizontal flanges resting on said table top, the marginal edges of said flanges being turned upwardly, an oblong wire basket removably arranged in said tank and resting on said flat bottom, said basket being adapted to be supported in a raised position transversely of said tank with its ends resting on the longitudinal flanges of said tank to permit drainage from said basket into said tank, and a gas burner under the bottom of said tank and adapted to be connected to a portable gas supply tank.

3. In a portable fryer of the class described, the combination comprising a support frame, a table top arranged thereon, said top having an oblong opening near one side of said frame, an oblong tank arranged in said opening and having horizontal flanges resting on said top, there being marginal flanges extending vertically from said horizontal flanges, and an oblong wire basket removably arranged in said tank, said basket being adapted to rest on said horizontal flanges above said tank when said basket is turned to dispose its major axis transversely of said tank, whereby the contents of said basket can drain into said tank.

WILLIAM A. MELETIO.